United States Patent [19]

Kalmanash

[11] Patent Number: 4,991,941
[45] Date of Patent: Feb. 12, 1991

[54] METHOD AND APPARATUS FOR MULTI-COLOR DISPLAY

[75] Inventor: Michael H. Kalmanash, Los Altos, Calif.

[73] Assignee: Kaiser Aerospace & Electronics Corporation, Ofster City, Calif.

[21] Appl. No.: 205,814

[22] Filed: Jun. 13, 1988

[51] Int. Cl.$^5$ .............................................. G02F 1/13
[52] U.S. Cl. ................ 350/347 E; 350/337; 350/345
[58] Field of Search ............ 350/347 E, 337, 334, 350/335, 345, 352

[56] References Cited

U.S. PATENT DOCUMENTS

| | | | |
|---|---|---|---|
| 3,694,053 | 9/1972 | Kahn | 350/347 E |
| 4,097,128 | 6/1978 | Matsumoto et al. | 350/335 |
| 4,582,396 | 4/1986 | Bos et al. | 350/347 E |
| 4,583,825 | 4/1986 | Buzak | 350/335 |
| 4,635,051 | 1/1987 | Bos | 350/337 X |
| 4,652,087 | 3/1987 | Bos et al. | 350/347 EX |
| 4,674,841 | 6/1987 | Buzak | 350/337 |
| 4,770,500 | 9/1988 | Kalmanash et al. | 350/347 E |
| 4,867,536 | 9/1989 | Pidsosny et al. | 350/337 |

FOREIGN PATENT DOCUMENTS 1396828  6/1975  France ........................ 350/347 E Primary Examiner—Stanley D. Miller
Assistant Examiner—Huy K. Mai
Attorney, Agent, or Firm—Marvin H. Kleinberg; Matthew F. Jodziewicz

[57] ABSTRACT

A field sequential color shutter display system including a light source emitting light rays having substantially first and second different primary colors. First and second light polarizing filters are included. The filters are aligned in optical communication with the source. Each filter includes a color selective polarizing filter having substantially orthogonally oriented absorption axes. The first absorption axis of each light polarizing filter passes linearly polarized light of the first color and a uniform first polarization. The second absorption axis of each light polarizing filter passes linearly polarized light of both the first and second colors and a uniform second polarization. Variable optical retarding filters are disposed between the first and second light polarizing filters. Switching filters are in communication with the variable optical retarding filters to selectively provide first and second switching states to produce respective first and second amounts of optical retardation to develop, over a relatively broad range of viewing angles, a light output through the second light polarizing filter of either the first color, or, a composite light output containing both the first color, having both the first and second polarizations, and the second color having only the second polarization.

38 Claims, 2 Drawing Sheets

METHOD AND APPARATUS FOR MULTI-COLOR DISPLAY

BACKGROUND OF THE INVENTION

1. Field of the Invention

This invention relates in general to a method and an apparatus for producing multi-color displays, and, more particularly, to a field sequential color shutter display system employing light polarizers and filters in conjunction with a liquid crystal cell combination.

2. Description of the Related Art

The present invention is an improvement over that invention disclosed and claimed in co-pending patent application Ser. No. 06/872,520 filed June 10, 1986, and now U.S. Pat. No. 4,770,500, of which I am a co-inventor and which is incorporated hereinto by reference.

The general idea of using a multi-color cathode ray tube in conjunction with liquid crystal cells and color polarizers has been described in numerous articles and issued patents such as the article by Brinson et al in IBM Technical Disclosure Bulletin Vol. 22, No. 5 of October 1979 and U.S. Pat. No. 4,582,396 to Bos et al.

In U.S. Pat. No. 4,582,396 to Bos et al., a typical field sequential color system is disclosed. A color sensitive polarizing means is placed in front of a cathode ray tube light source which is capable of emitting at least two colors. The polarizing means has a first absorption axis that passes linearly polarized light of the first color and a second absorption axis that passes linearly polarized light of the second color. A liquid crystal cell functions as a variable optical retarder in association with the polarizing filter means to selectively transmit a first or a second color, depending on the polarization of the light. The liquid crystal cell is followed by a linear polarizer.

When the liquid crystal cell is driven by a first signal it provides a half wave retardation to the applied light. When it is driven by a second signal, substantially no retardation is experienced by the impinging light. With substantially no retardation of the light, only light of one of the two colors can pass through the linear polarizer. With half wave retardation, only light of the other of the two colors can pass through the polarizer.

The device employs a specially designed liquid crystal cell to function as the variable retarder. A nematic liquid crystal cell is designed to be disclination-free and to switch in a "bounce-free" manner as it is switched between two states which alter the orientation of the surface non-contacting directors of the liquid crystal material in the cell.

The Bos et al. reference is typical of the prior art devices currently in use.

In these sequential color shutter systems, the image source, typically a cathode ray tube, emits light in a plurality of colors, for example, green and red. The bare cathode ray tube would then appear to emit yellow light (which is green and red combined) and would be viewed by an observer through a color shutter. The color shutter would permit information to be presented in either a red, green, or an intermediate color by changing light polarization states synchronously with the color information that is to be written. In its green state, the color shutter would transmit a certain percentage of green light, while absorbing a much higher percentage of red light, while the opposite would occur in the red state.

Intermediate colors, such as yellow, would be generated either by setting the shutter to an intermediate state where absorption in both primary colors would be more or less equal, or by "double-writing" yellow information in both of the primary colors.

In either case, systems of the type described above suffer from the relatively low transmission level of the selected color, which, in turn, leads to limited display brightness.

The present invention provides both a method and an apparatus to overcome the shortcomings of the prior art to produce a bright color display system suitable for use under both sunlight and night time conditions.

As a practical example of how the improved technology incorporated and found in both a device embodying the present invention, and the method of the present invention, may be used in current practical situations, the reader need only consider avionics multifunction display applications as used in tactical military aircraft.

In avionics systems such as this, which are capable of both raster and stroke display modes, the raster modes are often used for the display of monochrome sensor video information, while color information is presented in the stroke modes. Higher raster writing rates and the requirements for sunlight readability of multiple gray shade video-images make the (green) raster modes the more demanding of the two types of modes from a brightness/contrast viewpoint.

Reducing the red phosphor emission from the cathode ray tube (as is required for the improved configuration discussed below), proportionally increases the green light output from the cathode ray tube under the same drive conditions, thus raising the display efficiency in this color. While this configuration would reduce the red light output from the cathode ray tube, the overall red display luminance is enhanced by the high transmission of the color shutter in the red state as described in FIG. 4 below. Further, the brightness/contrast requirements for all colors of stroke symbology are often lower than those for green raster video presentations, thus resulting in an overall enhancement of system capability.

SUMMARY OF THE INVENTION

It is an object of the present invention to provide an improved display which allows the use of liquid crystals over an extended temperature range in a field sequential color shutter display system.

It is another object of the present invention to provide an improved display which has higher transmission and reduced surface reflections and therefore reduced glare, making the display more useful in daylight, as well as giving high-purity reds and greens.

In general, the present invention is directed towards both a method and an apparatus, the apparatus of which can be found in a field sequential color shutter display system, as shown in FIG. 3, comprising a source of light that emits light rays of a plurality of colors and having substantially first and second different primary colors. First light polarizing means are in optical communication with the source, and include a color selective polarizing filter having first and second substantially orthogonally oriented absorption axes. The first absorption axis passes linearly polarized light of the first color. The second absorption axis passes linearly polarized light of both the first and second colors.

Second light polarizing means are in optical communication with the first light polarizing means, and include a polarizing filter having a first absorption axis substantially aligned with one of the first or second absorption axes of the first light polarizing means and passing linearly polarized light of both the first and second colors, and a second absorption axis of essentially zero transmission. Variable optical retarding means are disposed between the first and second light polarizing means.

Switching means are in communication with the variable optical retarding means to selectively provide first and second switching states to produce respective first and second amounts of optical retardation to develop, over a relatively broad range of viewing angles, a light output of either the first color, or a composite color containing both the first and second colors, through the second light polarizing means.

An alternate embodiment of a field sequential color shutter display system constructed in accordance with the present invention is shown in FIG. 4, and comprises a source of light that emits light rays of a plurality of colors and having substantially first and second different primary colors. First and second light polarizing means are included. The first light polarizing means are in optical communication with the source, and the second light polarizing means are in optical communication with the first light polarizing means.

Each of the light polarizing means includes a color selective polarizing filter having substantially orthogonally oriented absorption axes. The first absorption axis of each light polarizing means passes linearly polarized light of the first color. The second absorption axis of each light polarizing means passes linearly polarized light of both the first and second colors. The respective absorption axes of the first and second light polarizing means are in substantial alignment with one another.

Variable optical retarding means are disposed between the first and second light polarizing means. Switching means are in communication with the variable optical retarding means to selectively provide first and second switching states to produce respective first and second amounts of optical retardation in order to develop, over a relatively broad range of viewing angles, a light output through the second light polarizing means of either the first color, or, a composite light output containing both the first color, having both the first and second polarizations, and the second color having only the second polarization.

A method of providing a field sequential color shutter display system in a high ambient light environment in accordance with the present invention, comprises the steps of generating a source of light having at least two different wavelength components of a first and a second color. The light thus generated is polarized using a color selective polarizing filter having first and second substantially orthogonally oriented absorption axes. The first absorption axis passes linearly polarized light of the first color, while the second absorption axis passes linearly polarized light of both the first and second colors.

The polarized light passes through a variable optical retarding element followed by a second polarizer for selectively transmitting light of either the first color and polarization, or of a composite color containing both the first and second colors and second polarization determined by the amount by which the light has been optically retarded.

The light is selectively retarded by utilizing variable optical retarding means disposed between the color selective polarizing filter and the output polarizer. The amount of optical retardation is controlled by at least first and second retardations to result in the emission of light of either the first color and polarization, or a composite color containing both the first and second colors and second polarization.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

While the maximum theoretical transmission of polarizer based color shutters is on the order of fifty percent, practical color systems exhibit much lower transmissions in the order of ten percent or so. (See FIG. 2)

Figure 1:
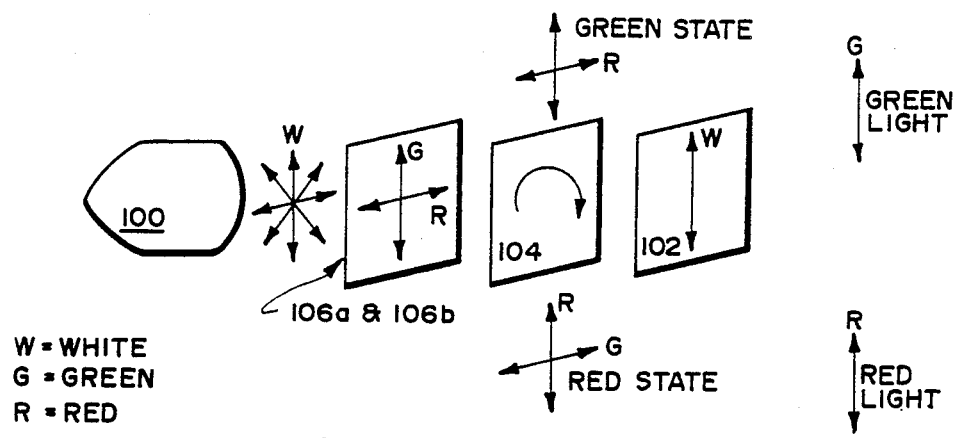
FIG. 1 is a simplified block diagram of a field sequential color display system incorporating a variable retarder which is included in an optical assembly to function as an optical switch in accordance with the prior art.
Figure 2A:
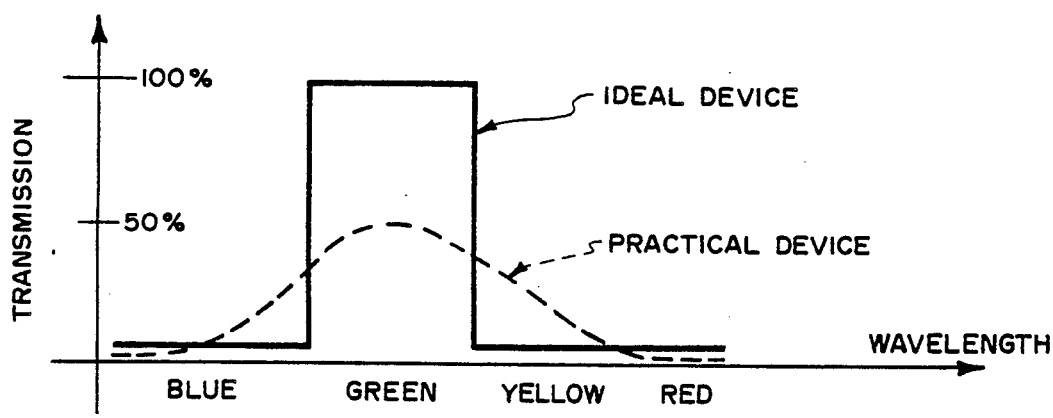
FIGS. 2A and 2B are graphs illustrating the relationship between the transmission values along the "colored" polarizer axis and light wavelengths of a practical versus ideal green and red polarizer transmissions respectively.
Figure 2B:
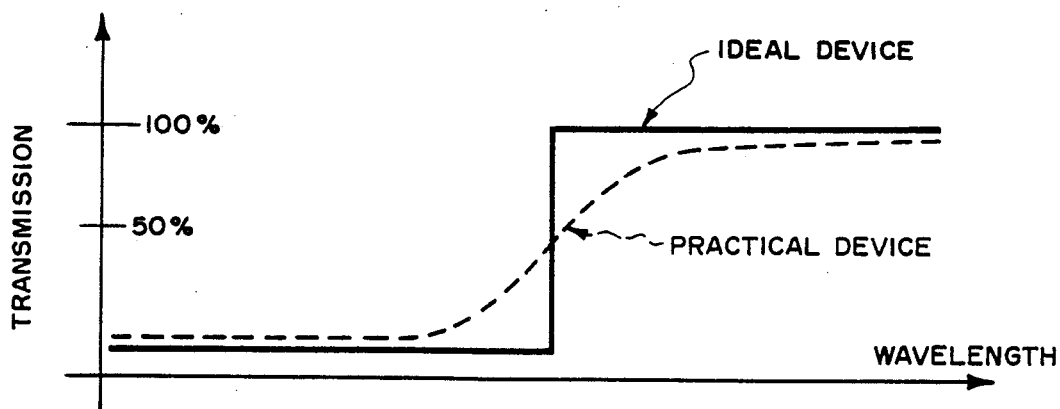

This degradation in actual transmission over the theoretical can be explained by reviewing the basic operating principles of these systems. As shown in FIG. 1, the different primary colors emitted by the cathode ray tube light source 100 are polarized orthogonally, with the appropriate color (plane of polarization) being selected by the output polarizer (analyzer) 102 under control of the liquid crystal element (rotator) 104. Thus, only one plane of polarization is selected at a time and therefore, in the most ideal case, fifty percent of the initially unpolarized cathode ray tube light is absorbed. In actuality, all of the system elements are less than ideal, particularly the color polarizers 106a and 106b. FIGS. 2A and 2B show the spectral transmission characteristics of typical green and red color polarizers respectively, versus the "ideal" characteristics of such devices. Note, in particular, the low transmission of the practical green color polarizer.

This limitation of the prior art devices is addressed in the present invention. In the present invention the color of the light emitted by the bare cathode ray tube light source is itself one of the primary colors of the system display, thus, one of the color polarizers found in many of the prior art devices may be eliminated. Using the same colors as the previous example, the light output from the bare cathode ray tube light source would appear green if the proportion of green light in its emission spectrum was far greater than the proportion of red, as might be accomplished by changing the phosphor blend of the cathode ray tube. Information then could be displayed in red by using the red filter state as described above, and could likewise be displayed in green by using an "open" color shutter, i.e., one that passed all colors.

In this manner, the green state transmission of the present invention is markedly improved over prior art devices. This configuration is illustrated in FIG. 3.

Figure 3:
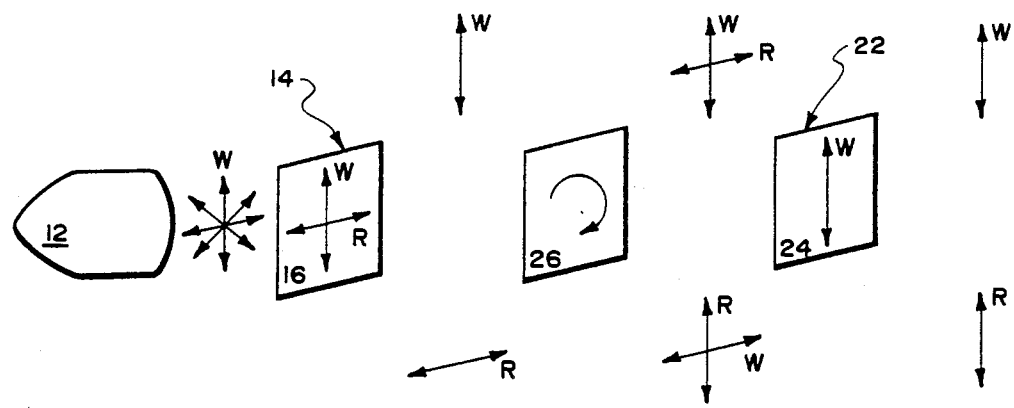
FIG. 3 is a simplified block diagram of a field sequential color display system incorporating a variable retarder which is included in an optical assembly to function as an optical switch in accordance with the present invention.

In FIG. 3 the red state performance of the system is the same as for the system shown in FIG. 1. The light output in the green state, however, is markedly improved over the system of FIG. 1 by the elimination of the green polarizer 106b.

Figure 4:
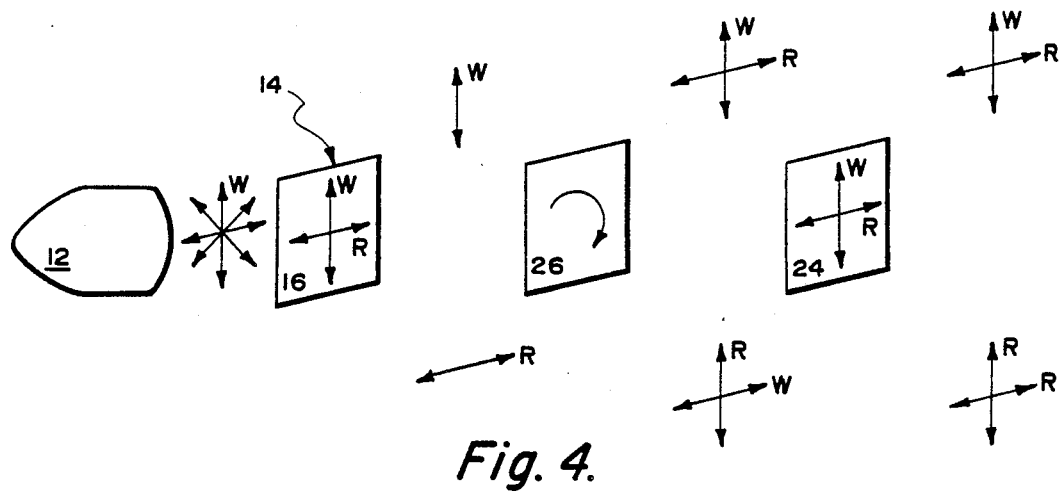
FIG. 4 is a simplified block diagram of an alternate field sequential color display system incorporating a variable retarder which is included in an optical assembly to function as an optical switch in accordance with the present invention.

A further improvement in system performance is attained by the configuration shown in FIG. 4. In this configuration, the improvements resulting from the elimination of the green polarizer 106a remain, but further system improvements are provided in the transmission of the red state by the substitution of a second red polarizer for the analyzer 102. This substitution permits the red output of the system to be transmitted unpolarized to the observer with roughly twice the efficiency of previous system configurations.

Figure 5:
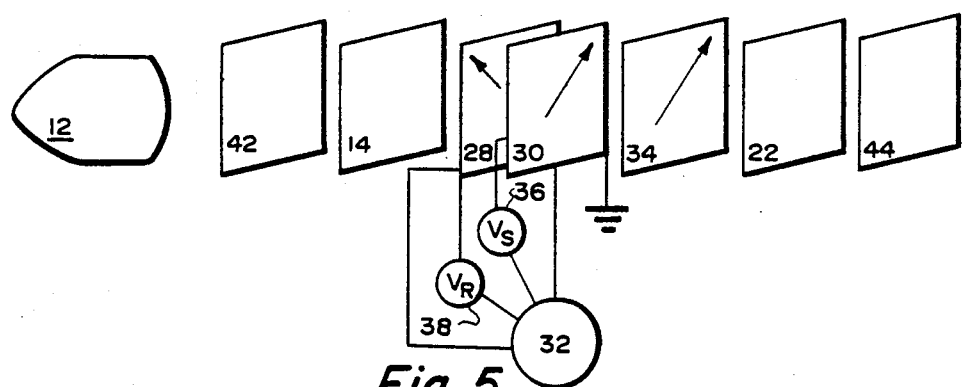
FIG. 5 is a sectional view of a field sequential color display system incorporating a variable retarder which is included in an optical assembly to function as an optical switch in accordance with the present invention.

FIG. 5 illustrates for clarity the cross-sectional composition of a display system incorporating the present invention.

In general, prior art devices, as shown in FIG. 1, tend to use a neutral polarizer 102 to select between two color polarizers 106a, 106b to determine the display color (usually green, red and a composite yellow). In the green state, the neutral polarizer 102 is aligned to the green polarizer 106a, which blocks transmission of the red phosphor light. Similarly, in the red state, the red polarizer 106b blocks the green component of the phosphor light. Contrast is then determined by the filter transmission in the different and the background luminance level from the ambient double pass through the filter, as well as the front surface and multiple internal filter reflections.

In these prior art devices, measured display contrast has been limited in full daytime ambients by background levels, due to internal filter reflections. To compensate for this, the present invention suggests a new phosphor blend to permit higher light source (cathode ray tube) output. This blend, consisting of approximately 90% P43 Green and 10% P56 Red, is green in appearance ($x=0.36$ and $y=0.53$, using the 1931 CIE system of coordinates as a reference standard). This suggests that perhaps the green polarizer of prior art devices might be omitted from the filtering system. The green state color would then be similar to the phosphor color, while the red state color would be defined by the red polarizer as it is currently (see FIG. 3).

The advantage of this change is that it would increase the green state filter transmission through the system by more than a factor of two (green polarizer transmission of P43 is less than 40%). This would markedly increase display brightness and would therefore be of immediate benefit for color HDD and HUD applications. For head down systems (HDD), contrast could then be improved by adding a neutral density filter (NDF) to the front portion of the display system.

To understand these effects, consider a nominal example. Say the current prior art systems in a 10,000 fl. ambient exhibit a background luminance of 125 fl. This would be partitioned roughly as follows: front surface (AR-coated): 25 fl.; double pass reflection from phosphor: 40 fl.; and, internal filter reflections: 60 fl.

By doubling the filter transmission (removing the green polarizer) and adding a 50% transmission neutral density filter to the front end of the display system, the overall display highlight brightness would remain the same, as would the front surface and double pass reflections. The internal reflections would be reduced by a factor of four (due to attenuation by double pass through the neutral density filter), so the overall background ambient light would be reduced to approximately 80 fl. (25 fl. + 40 fl. + 60/4 fl.)

Thus, if the contrast had been 3.6 in 10,000 fl. (that is, a display highlight brightness of 325 fl. with 125 fl. background), with the new configuration of the present invention, contrast would be 5.1, at the same light source (CRT) brightness.

Alternatively, 3.6 contrast would be attainable with only 208 fl. of display highlight brightness allowing less CRT light output, with resulting improvements in resolution, phosphor life, etc.

These improvements of the present invention described so far only relate to the green state, since the red state transmission is improved by no more than 10% to 15% by elimination of the green polarizer. A color balance filter of higher red transmission than green would further improve green contrast without sacrificing red brightness, but a better approach found in the present invention is to consider the configuration of the invention as shown in FIG. 4.

In FIG. 4, the neutral polarizer is replaced by a second red polarizer. In the green state the effect of this is additional red leakage which would cause a slight hue shift, but in the red state, the effect is to double the red light output from the display system. In this configuration, red light is essentially unpolarized. Thus, the contrast advantages described above would apply equally to the red and green states.

These improvements, found in the present invention, apply to various configurations of the variable optical retarder, including, push-pull configurations as well as single element configurations, and are independent of whether zero twist or Pi cells are used in the display.

In practical terms, the changes to the filter architecture itself permit reconfiguration of the entire display system for improved performance.

Turning first to FIG. 3, there is shown in idealized side view, the elements comprising a display 10 incorporating the present invention.

A field sequential color shutter display system 10, incorporating the present invention in a preferable embodiment would comprise a source of light that emits light rays having substantially first and second different primary colors or wavelength.

Such an acceptable light source would be a cathode ray tube ("CRT") 12 that displays information in the form of a pattern of illuminated phosphors. Preferably, a special tube is utilized which, when energized, emits light in at least a first and a second narrow range of primary wavelengths.

However, it is preferred that the proportion of light of the first and second colors emitted by the source be unequal. Specifically, it is preferred that the proportion of light of one wavelength be less than the proportion of light of the other color wavelength so that when combined, light of the greater proportioned wavelength color visually predominates to an observer. Thus, in the absence of any special "color switch", the CRT display would appear to an observer to be monochromatic in the predominant wavelength or color.

In a preferred embodiment of the invention, the light emitted from the light source is modulated in synchronism with a switching circuit, described below, to produce images appearing to have a multi-colored appearance to a human observer.

A first light polarizing filtering system 14 is positioned in optical communication with the light source 12. This first polarizing filtering system 14 includes a color selective polarizing filter 16 having first and second substantially orthogonally oriented absorption axes. The first absorption axis of the color selective polarizing filter 16 passes linearly polarized light of a first color or wavelength, while the second absorption axis passes linearly polarized light of both colors or wavelengths.

A preferred configuration of this color selective polarizing filter would be comprised of first and second pleochroic linear polarizering filters in adjacent optical communication having substantially orthogonally aligned absorption axes. The absorption axis of the first pleochroic polarizer transmits light of the first color, while the absorption axis of the second pleochroic polarizer transmits light of both first and second colors.

A second light polarizing filtering system 22 is positioned in optical communication with the first light polarizing filtering system 14. This second filtering system includes a neutral polarizing filter 24 having a first absorption axis substantially aligned with one of the absorption axes of the first light polarizing filtering system 14 for passing linearly polarized light of both colors or wavelengths, and a second absorption axis of essentially zero transmission.

A liquid crystal variable optical retarder 26 is disposed between the first and second light polarizing filtering systems 14, 22, respectively. It is preferably a zero to substantially half-wave retarder for light of the first color. The first retardation amount is essentially zero retardation so as to permit the retarder to transmit a light output containing both of the first and second colors having a uniform second polarization. The second retardation amount is essentially half-wave retardation that transmits through the retarder a light output of the first color having a uniform second polarization.

In order to appreciate the invention more easily, consider a single variable zero-to-half wave retarder being comprised of two liquid crystal cells and the fixed quarter wave retardation plate. This is the same function that a single liquid crystal cell has in the previously described configuration.

In general, the operation of the invention is that each liquid crystal cell functions as a zero-to-quarter wave retarder, but one cell has its retardation add to the fixed quarter wave retarder plate while the other cell has its retardation subtract from the fixed quarter wave retarder plate. A quarter wave retardation plus an additional quarter wave retardation results in a half wave retardation, while a quarter wave retardation minus a quarter wave retardation results in a net zero wave retardation. As a result, a net difference of one half wave is achieved between the two states. With the liquid crystal and waveplate axes oriented at 45 degrees with respect to the polarizer axes, a half wave wave retardation corresponds to 90 degrees of rotation of the circularly polarization of transmitted light, while a quarter wave retardation converts linearly polarized light to circularly polarized light.

Thus, each liquid crystal cell can convert the originally linearly polarized light to circularly polarized light, but the fixed quarter wave retarder plate re-converts the light back to linearly polarized light (rotated or not depending on which liquid crystal cell has been set to provide for a quarter wave retardation).

Following this line of reasoning, there is no difference between the two liquid crystal cell configuration and the one liquid crystal cell configuration in terms of how the desired colors are generated. The real advantage of the former configuration is that it is faster in switching over a wider temperature range than the latter configuration.

A preferred variable optical retarder 26 is found in known liquid crystal cells 28, 30 having liquid crystal material with alignment directors. These liquid crystal cells 28, 30 are responsive to electric fields of different intensities introduced within the cell by the first and second switching states of switching circuitry 32. The first switching state provides a higher intensity electric field to cause the directors to align substantially end-to-end in a direction parallel to the flux lines of the electric field while the second switching state provides a lower intensity electric field to cause the directors to recede from the end-to-end alignment to an alignment in which a component of each one of a substantial number of the directors is projected on the surfaces of the cell.

More specifically, a preferred variable optical retarder 26, as shown in FIG. 5, incorporates first and second liquid crystal cells 28, 30 and a fixed quarter wave retarder 34, with the slow axis of the fixed quarter wave retarder oriented substantially parallel to the optic axis of the first liquid crystal cell 28 and substantially orthogonal to the optic axis of the second liquid crystal cell 30. With this structure, the retardation in the first liquid crystal cell adds to the retardation of the fixed quarter wave retarder, and retardation from the second liquid crystal cell subtracts from the retardation of the fixed quarter wave retarder. Therefore, by selectively choosing to either sum or subtract the retardation caused by the cells with respect to the fixed quarter wave retarder, the transmitted light output will have either a resulting zero or a half-wavelength retardation.

The first and second liquid crystal cells 28, 30 are serially connected between a source of potential 36, and a source of reference potential 38 as better described below. The reference potential is set to be equal to the sum of the first and second potential levels, and the potential levels are coupled to the interconnection of the first and second cells 28, 30 as shown in the figures. In this structure, each liquid crystal cell is capable of optically retarding light by up to one-quarter of a wave upon application of a potential at the first level and of imposing substantially no retardation upon the application of a potential of a potential at the second level.

Switching circuitry 32 controls the variable optical retarder 26 to selectively provide first and second switching states to produce respective first and second amounts of optical retardation to develop, over a relatively broad range of viewing angles, a light output of either the first color, or a composite color containing both of the first and second colors, for transmission through the second light polarizing filtering system 22.

A source of electric potential, not shown, such as a battery, generator, alternator or even magneto, provides first and second voltage levels that can be applied to each of the cells 28, 30, for selectively controlling, by means of the switching circuitry 32, the amount of optical retardation imposed by each of the cells.

Since in many head down display systems, the measured display contrast is limited in full sunlight by background ambient light levels due to internal filter reflections, the preferred display system 10 also includes neutral density filters 42, 44, in the optical path between the light source 12 and the first light polarizing filtering system 14 and at the output of the second light polarizing filtering system 22 for limiting emitted light to the first and second colors at the first light polarizing filtering system 14 and to eliminate unwanted colors from the output of the display system 10. These filters 42, 44 will improve display contrast by reducing reflected ambient light throughout the display system without substantially affecting display brightness compared to prior art systems.

A preferred method of providing a field sequential color shutter display system in a high ambient light environment in accordance with the present invention comprises first generating a source of light having at least two different wavelength components of a first and a second color.

The light thus generated is polarized using a color selective polarizing filter having first and second substantially orthogonally oriented absorption axes. The first absorption axis passing linearly polarized light of the first color and a uniform first polarization, while the second absorption axis passing linearly polarized light of both the first and second colors and a uniform second polarization.

Components of the polarized light are now selectively retarded to produce linearly polarized light of either zero or 90 degrees rotation, or circularly polarized light.

The light is linearly polarized for selectively transmitting light of either the first color and polarization, or of a composite color containing both first and second colors and second polarization determined by the amount by which the light has been optically retarded.

The amount of optical retardation is selectively controlled by at least first and second retardations to result in the emission of light of either the first color and polarization, or a composite color containing both first and second colors and second polarization. This can be accomplished by applying first and second control signals to liquid crystal cells for determining the amount of optical retardation imposed by each of the cells. These liquid crystal cells can be serially connected between a source of potential and a source of reference potential wherein the reference potential is set to be equal to the sum of the first and second levels, and applying the potential levels to the interconnection of the first and second cells.

The light is optically retarded up to one fourth of a wavelength in each of the liquid crystal cells upon application of a potential at the first level and of imposing substantially no retardation upon the application of a potential at the second level, and placing a quarter wave retarder between the second liquid crystal cell and the second light polarizing means.

The first and second liquid crystal cells are oriented with respect to the first polarizing filter such that upon the application of a potential at the first level, one of the cells converts linearly polarized light to right hand circularly polarized light and the other of the cells passes light substantially without retardation resulting, in light passing through the second light polarizing means with a net retardation of one half wave (90 degree rotation of the plane of polarization), and upon application of a potential at the second level, the cell imposes substantially no retardation on impinging light while the other of the cells converts linearly polarized light to left hand circularly polarized light which passes through the second light polarizing filter with substantially no retardation (no rotation of the plane of polarization).

Alternatively, the optical retardation of the light can also be accomplished by using a single liquid crystal cell instead of the two cell configuration discussed above.

The light images produced by the light source can be modulated in synchronism with a predetermined control system to produce images appearing to have multiple colors.

The light images produced by the light source can also be filtered at the beginning and end of the light path before and after the first light polarizing step and the second light polarizing step for limiting emitted light to the first and composite colors, in order to eliminate unwanted colors from the output of the system and to improve display contrast by reducing reflected ambient light without substantially affecting display brightness.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. A field sequential color shutter display system, comprising:

a source of light that melts light rays of a plurality of colors and having substantially first and second different primary colors, one of said first and second different primary colors being itself one of the primary colors of the display system;

first light polarizing means in optical communication with said source, including a color selective polarizing filter having first and second substantially orthogonally oriented absorption axes, said first absorption axis passing linearly polarized light of said first color, said second absorption axis passing linearly polarized light of both said first and second colors;

second light polarizing means in optical communication with said first light polarizing means, including a polarizing filter having a first absorption axis substantially aligned with one of said first or second absorption axes of said first light polarizing means and passing linearly polarized light of both said first and second colors, and a second absorption axis of essentially zero transmission;

liquid crystal variable optical retarding means disposed between said first and second light polarizing means; and switching means in communication with said variable optical retarding means to selectively provide first and second switching states to produce respective first and second amounts of optical retardation to develop, over a relatively broad range of viewing angles, a light output of either said first color, or a composite color containing both said first and second colors, through said second light polarizing means.

2. A field sequential color shutter display system as in claim 1 in which the proportion of light of said first color emitted by said source is unequal to the proportion of light of said second color emitted by said source.

3. A field sequential color shutter display system as in claim 2 in which the proportion of light of said first color emitted by said source is less than the proportion of light of said second color emitted by said source so that when combined, light of said second color visually predominates to an observer.

4. A field sequential color shutter display system as in claim 2 in which the proportion of light of said first color emitted by said source is greater than the proportion of light of said second color emitted by said source so that when combined, light of said first color predominates to an observer.

5. A field sequential color shutter display system as in claim 1 in which the color selective polarizing filter of said first light polarizing means includes first and second pleochroic linear polarizers having substantially orthogonally aligned absorption axes, the absorption axis of the first pleochroic polarizer transmitting light of both said first and second colors.

6. A field sequential color shutter display system as in claim 1 in which the variable optical retarding means is a zero to substantially half-wave retarder for light of said first color, and the first retardation amount is essentially zero retardation transmitting a light output containing said first and second colors having said uniform second polarization, and the second retardation amount is essentially half-wave retardation to develop a light output of said first color having said uniform second polarization.

7. A field sequential color shutter display system as in claim 1 in which the variable optical retarding means comprises a liquid crystal cell having liquid crystal material with alignment directors, said alignment directors oriented at substantially 45 degrees with respect to said polarizing means absorption axes, said liquid crystal cell being responsive to electric fields of different intensities introduced within said cell by said first and second switching states of said switching means, said first switching state providing a higher intensity electric field to cause said directors to align substantially end-to-end in a direction parallel to the flux lines of the electric field and said second switching state providing a lower intensity electric field to cause said directors to recede from the end-to-end alignment to an alignment in which a component of each one of a substantial number of said directors is projected on the surfaces of said cell.

8. A field sequential color shutter display system as in claim 1 in which the light emitted from said source is modulated in synchronism with said switching means to produce images appearing to have a multi-colored appearance.

9. A field sequential color shutter display system as in claim 1 including a first filter means in the optical path between said source and said first light polarizing means and a second filter means at the output of said second light polarizing means for limiting emitted light to said first and second colors at said first light polarizing means and to eliminated unwanted colors from the output of said system and to improve display contrast by reducing reflected ambient light without substantially affecting display brightness 10. A field sequential color shutter as in claim 1 in which said switching means includes a source of electric potential at first and second levels and means for applying said electric potential levels for determining the amount of optical retardation imposed by said switching means.

11. A field sequential color shutter display system as in claim 1 in which the variable optical retarding means comprises first and second liquid crystal cells and a fixed quarter wave retarder, with the slow axis of said fixed quarter wave retarder oriented substantially parallel to the optic axis of said first liquid crystal cell and substantially orthogonal to the optic axis of said second liquid crystal cell, such that retardation in said first liquid crystal cell adds to the retardation of said fixed quarter wave retarder and retardation from said second liquid crystal cell subtracts from the retardation of said fixed quarter wave retarder.

12. A field sequential color shutter display system as in claim 11 in which said first and second liquid crystal cells are serially connected between a source of potential and a source of reference potential and said reference potential is set to be equal to the sum of said first and second levels, and means for applying said potential levels coupled to the interconnection of said first and second cells.

13. A field sequential color shutter display system as in claim 12 wherein each said liquid crystal cell is capable of optically retarding light by up to one-quarter of a wavelength upon application of a potential at said first level and of imposing substantially no retardation upon the application of a potential at said second level.

14. A field sequential color shutter display system as in claim 11 wherein each said liquid crystal cell is capable of optically retarding light by up to one-quarter of a wavelength upon application of a potential at said first level and of imposing substantially no retardation upon the application of a potential at said second level.

15. A field sequential color shutter display system as in claim 1 in which the variable optical retarding means comprises first and second liquid crystal cells and a fixed quarter wave retarder, with the axes of said liquid crystal cells and fixed quarter wave retarder being substantially at 45 degrees with respect to said polarizing means axes.

16. A field sequential color shutter display system, comprising:
   a source of light that emits light rays of a plurality of colors and having substantially first and second different primary colors;
   first and second light polarizing means, said first light polarizing means in optical communication with said source and said second light polarizing means in optical communication with said first light polarizing means, each of said light polarizing means including a color selective polarizing filter having substantially orthogonally oriented absorption axes, the first absorption axis of each light polarizing means passing linearly polarized light of said first color, the second absorption axis of each light polarizing means passing linearly polarized light of both said first and second colors, said respective absorption axes of said first and second light polarizing means being in substantial alignment with one another;

liquid crystal variable optical retarding means disposed between said first and second light polarizing means; and switching means in communication with said variable optical retarding means to selectively provide first and second switching states to produce respective first and second amounts of optical retardation to transmit, over a relatively broad range of viewing angles, a light output containing both said first color, having said first and second polarization, and said second color having said second polarization.

17. A field sequential color shutter display system as in claim 16 in which the proportion of light of said first color emitted by said source is unequal to the proportion of light of said second color emitted by said source.

18. A field sequential color shutter display system as in claim 17 in which the proportion of light of said first color emitted by said source is less than the proportion of light of said second color emitted by said source so that when combined, light of said second color predominates to an observer.

19. A field sequential color shutter display system as in claim 17 in which the proportion of light of said first color emitted by said source is greater than the proportion of light of said second color emitted by said source so that when combined, light of said first color predominates to an observer.

20. A field sequential color shutter display system as in claim 16 in which the color selective polarizing filter of said first light polarizing means includes first and second pleochroic linear polarizers having substantially orthogonally aligned absorption axes, the absorption axis of the first pleochroic polarizer transmitting light of said first color, and the absorption axis of the second pleochroic polarizer transmitting light of both said first and second colors.

21. A field sequential color shutter display system as in claim 16 in which the variable optical retarding means is a zero to substantially half-wave retarder, and the first retardation amount is essentially zero retardation to develop a light output containing both said first and second colors having said uniform second polarization, and the second retardation amount is essentially zero retardation to develop a light output containing both said first and second colors having said uniform second polarization, and the second retardation amount is essentially half-wave retardation to transmit a light output of said first color having said uniform second polarization.

22. A field sequential color shutter display system as in claim 16 in which the variable optical retarding means comprises a liquid crystal cell having liquid crystal material with alignment directors, said liquid crystal cell being responsive to electric fields of different intensities introduced within said cell by said first and second switching states of said switching means, said first switching state providing a higher intensity electric field to cause said directions to align substantially end-to-end in a direction parallel to the flux lines of the electric field and said second switching state providing a lower intensity electric field to cause said directors to recede from the end-to-end alignment to an alignment in which a component of each one of a substantial number of said directors is projected on the surfaces of said cell.

23. A field sequential color shutter display system as in claim 16 in which the light emitted from said source is modulated in synchronism with said switching means to produce images appearing to have a multi-colored appearance.

24. A field sequential color shutter display system as in claim 16 including a first filter means in the optical path between said source and said first light polarizing means and a second filter means at the output of said second light polarizing means for limiting emitted light to said first and second colors at said first light polarizing means and to eliminate unwanted colors from the output of said system and to improve display contrast by reducing reflected ambient light without substantially affecting display brightness.

25. A field sequential color shutter as in claim 16 in which said switching means includes a source of electrical potential at first and second levels and means for applying to each of said cells said electric potential levels for determining the amount of optical retardation imposed by each of said cells.

26. A field sequential color shutter display system as in claim 16 in which the variable optical retarding means comprises first and second liquid crystal cells and a fixed quarter wave retarder, with the slow axis of said fixed quarter wave retarder oriented substantially parallel to the optical axis of said first liquid crystal cell and substantially orthogonal to the optical axis of said second liquid crystal cell such that retardation in said first liquid crystal cell adds to the retardation of said fixed quarter wave retarder and retardation from said second liquid crystal cell subtracts from the retardation of the fixed quarter wave retarder.

27. A field sequential color shutter display system as in claim 26 in which said first and second liquid crystal cells are serially connected between a source of potential and a source of reference potential and said reference potential is set to be equal to the sum of said first and second levels, and said means for applying said potential levels is coupled to the interconnection of said first and second cells.

28. A field sequential color shutter display system as in claim 27 wherein each said liquid crystal cell is capable of optically retarding light by up to one fourth of a wavelength upon application of a potential at said first level and of imposing substantially no retardation upon the application of a potential at said second level.

29. A field sequential color shutter display system as in claim 26 wherein each said liquid crystal cell is capable of optically retarding light by up to one fourth of a wavelength upon application of a potential at said first level and of imposing substantially no retardation upon the application of a potential at said second level.

30. A field sequential color shutter display system as in claim 26 wherein said first and second liquid crystal cells are oriented with respect to said first polarizing means such that upon the application of a potential at said first level, one of said cells converts linearly polarized light to right hand circularly polarized light and the other of said cells passes light substantially without retardation such that the further transmission through said fixed quarter wave retarder results in light passing through said second light polarizing means with a net retardation of one half wavelength (90 degrees rotation of the plane of polarization), and upon application of a potential at said second level, said cell imposes substantially no retardation of impinging light and the other of said cells converts linearly polarized light to left hand circular polarized light which passes through said fixed quarter wave retarder results in light passing through said second light polarizing means with substantially no retardation.

31. A method of providing a field sequential color shutter display system in a high ambient light environment comprising the steps of:
  generating a source of light having at least two different wavelength components of a first and a second color;
  polarizing the light thus generated using a color selective polarizing filter having first and second substantially orthogonally oriented absorption axes, said first absorption axis passing linearly polarized light of said first color and a uniform first polarization, said second absorption axis passing linearly polarized light of both said first and second colors and a uniform second polarization;
  selectively retarding components of said polarized light to produce linearly polarized light of either zero or 90 degrees rotation, or circularly polarized light;
  linearly polarizing said light for selectively transmitting light of either said first color and polarization, or of a composite color containing both said first and second colors and second polarization determined by the amount by which the light has been optically retarded; and
  controlling the amount of optical retardation by at least first and second retardations to result in the emission of light of either said first color and polarization, or a composite color containing both said first and second colors and second polarization.

32. A method of providing a color display as in claim 31 further including the step of modulating the light being emitted from said source in synchronism with a predetermined control system to produce images appearing to have multiple colors.

33. A method of providing a color display as in claim 31 further including the steps of filtering the light at the beginning and end of the light path before and after the first light polarizing step and the second light polarizing step for limiting emitted light to said first and composite colors to eliminate unwanted colors from the output of said system and to improve display contrast by reducing reflected ambient light without substantially affecting display brightness.

34. A method of providing a color display as in claim 31 in which the variable optical retarding step includes applying first and second control signals to liquid crystal cells for determining the amount of optical retardation imposed by each of said cells.

35. A method of providing a color display as in claim 31 including the step of connecting said first and second liquid crystal cells serially between a source of potential and a source of reference potential wherein said reference potential is set to be equal to the sum of said first and second levels, and applying said potential levels to the interconnection of said first and second cells.

36. A method of providing a color display as in claim 35 including the step of optically retarding light up to one fourth of a wavelength in each said liquid crystal cell upon application of a potential at said first level and of imposing substantially no retardation upon the application of a potential at said second level, and placing a quarter wave retarder between said second liquid crystal cell and said second light polarizing means.

37. A method of providing a color display as in claim 36 including the step of optically retarding light up to one fourth of a wavelength in each said liquid crystal cell upon application of a potential at said first level and of imposing substantially no retardation upon the application of a potential at said second level, and placing a quarter wave retarder between said second liquid crystal cell and said second light polarizing means.

38. A method of providing a color display as in claim 35 further including the step of orienting said first and second liquid crystal cells with respect to said first polarizing means such that upon the application of a potential at said first level, one of said cells converts linearly polarized light to right hand circularly polarized light and the other of said cells passes light substantially without retardation resulting in light passing through said second light polarizing means with a net retardation of one half wave (90 degree rotation of the plane of polarization), and upon application of a potential at said second level, said cell imposes substantially no retardation on impinging light and the other of said cells converts linearly polarized light to left hand circular polarized light which passes through said second light polarized means with substantially no retardation.

* * * * *